US012726545B2

(12) United States Patent
Albion et al.

(10) Patent No.: US 12,726,545 B2
(45) Date of Patent: Sep. 1, 2026

(54) DATABASE CLIENT-SERVER REATTACHMENT TO PRESERVE SERVER SESSION STATE

(71) Applicant: SAP SE, Walldorf (DE)

(72) Inventors: Jeffrey Albion, Cambridge (CA); Ian McHardy, Waterloo (CA); Richard Jones, Oakville (CA); Jeehoon Cha, Seoul (KR); Seungchan Lee, Bellevue, WA (US); Martin Strenge, Berlin (DE); Martin Fei, Berlin (DE)

(73) Assignee: SAP SE, Walldorf (DE)

( * ) Notice: Subject to any disclaimer, the term of this patent is extended or adjusted under 35 U.S.C. 154(b) by 46 days.

(21) Appl. No.: 18/973,493

(22) Filed: Dec. 9, 2024

(65) Prior Publication Data

US 2026/0163950 A1 Jun. 11, 2026

(51) Int. Cl.

| | |
|---|---|
| ***G06F 13/00*** | (2006.01) |
| ***G06F 16/25*** | (2019.01) |
| ***H04L 67/146*** | (2022.01) |
| ***H04L 67/148*** | (2022.01) |
| ***H04L 67/2895*** | (2022.01) |

(52) U.S. Cl.
CPC .......... *H04L 67/148* (2013.01); *G06F 16/252* (2019.01); *H04L 67/146* (2013.01); *H04L 67/2895* (2013.01)

(58) Field of Classification Search
CPC . H04L 67/148; H04L 67/146; H04L 67/2895; G06F 16/252
USPC ......................... 709/228, 227, 201, 203, 230
See application file for complete search history.

(56) References Cited

U.S. PATENT DOCUMENTS

| | | | | |
|---|---|---|---|---|
| 9,239,868 | B2 * | 1/2016 | Neerincx | G06F 11/2023 |
| 10,084,862 | B2 * | 9/2018 | Kubota | H04L 67/14 |
| 11,122,019 | B2 * | 9/2021 | Dadhich | H04L 63/04 |
| 2013/0339533 | A1 | 12/2013 | Neerincx et al. | |

(Continued)

FOREIGN PATENT DOCUMENTS

AU 2022202867 A1 4/2022

OTHER PUBLICATIONS

Communication: “Extended European Search Report”, Jan. 30, 2026 (Jan. 30, 2026), European Patent Office, for European Application No. 25210853.5-1218, 11 pages.

*Primary Examiner* — Kenneth R Coulter
(74) *Attorney, Agent, or Firm* — Buckley, Maschoff & Talwalkar LLC

(57) ABSTRACT

A database client may establish a database session with a database server, including a session state, for a first TCP network connection through a first reverse proxy. A reattachment token is sent to the database client, and a database operation request is received from the database client through the first reverse proxy. Before or during execution of the database operation request (including any updates to the session state) an indication is received that the first reverse proxy will be terminated after a reattachment window. The server instructs the database client to perform a session reattachment and receives, from the database client, a session reattachment request, including the reattachment token, for a second TCP network connection through a second reverse proxy. The server verifies the reattachment token and resumes the database session with the database client, including the updated session state, for the second TCP network connection.

20 Claims, 17 Drawing Sheets

(56) References Cited

U.S. PATENT DOCUMENTS

| | | | | |
|---|---|---|---|---|
| 2017/0064003 | A1* | 3/2017 | Kubota | H04L 67/63 |
| 2021/0084016 | A1* | 3/2021 | Dadhich | H04L 63/166 |

* cited by examiner 112
152
DATABASE SERVER
162
102
ORIGINAL SESSION STATE
TCP
122
Request
DATABASE CLIENT
FIRST REVERSE PROXY
LOCAL TEMPORARY TABLES
OPEN RESULTS CURSORS
CURRENTLY EXECUTING QUERIES
TRANSACTIONS

1200

| SESSION IDENTIFIER 1202 | CLIENT IDENTIFIER 1204 | SESSION STATE 1206 | TCP CONNECTION 1208 |
|---|---|---|---|
| S_101 | C_101 | LOCAL TEMPORARY TABLES, OPEN RESULTS | |
| S_102 | C_102 | LOCAL TEMPORARY TABLES, TRANSACTIONS | |
| S_103 | C_101 | OPEN RESULTS CURSORS | |
| S_104 | C_103 | CURRENTLY EXECUTING QUERIES, TRANSACTIONS | |

*FIG. 12*

DATABASE CLIENT-SERVER REATTACHMENT TO PRESERVE SERVER SESSION STATE

BACKGROUND

A database client-server system in a cloud-based infrastructure may have a database server respond to requests from a database client. For example, FIG. 1A is a system 101 in which a database client 111 establishes a Transmission Control Protocol ("TCP") connection with a database server 151 through a first reverse proxy 121. FIG. 1B is a system 102 in which a database client 112 uses such a connection to transmit a request to a database server 152 through a first reverse proxy 122. The request might comprise, for example, a simple request (taking only a few sub-seconds or minutes to respond), a long-running request (taking many minutes or hours to respond), a transaction (e.g., a series of related requests), etc. While responding to the request, the database server 152 may update an original session state 162 containing, for example, information about the TCP connection, local temporary tables, open results in cursors, current executing queries, transactions, etc. FIG. 1C is a system 103 in which a database client 113 loses a connection with a database server 153 through a first reverse proxy 123. The connection might be lost involuntarily (e.g., because the first reverse proxy 123 failed) or voluntarily (e.g., when a cloud service provider performs maintenance on the first reverse proxy 123). As a result, FIG. 1D shows a database client 114 that resends the request to a database server 154 through a second reverse proxy 134. Because it is a new connection, however, the database server 154 established a new session state 164, including the new TCP information, and the original session state is lost. That is, the database server 154 must re-start execution of the request, resulting in delays in a response request.

It would therefore be desirable to provide database reattachment to preserve server session state in a secure, automatic, and efficient manner.

SUMMARY

According to some embodiments, a database client may establish a database session with a database server, including a session state, for a first TCP network connection through a first reverse proxy. A reattachment token is sent to the database client, and a database operation request is received from the database client through the first reverse proxy. Before or during execution of the database operation request (including any updates to the session state) an indication is received that the first reverse proxy will be terminated after a reattachment window. The server instructs the database client to perform a session reattachment and receives, from the database client, a session reattachment request, including the reattachment token, for a second TCP network connection through a second reverse proxy. The server verifies the reattachment token and resumes the database session with the database client, including the updated session state, for the second TCP network connection.

Some embodiments comprise: means for establishing a database session with a database server for a first Transmission Control Protocol ("TCP") network connection through a first reverse proxy; means for receiving a reattachment token from the database server through the first reverse proxy; means for transmitting a database operation request to the database server through the first reverse proxy; during or after execution of the database operation request, including any updates to a session state, means for receiving, through the first reverse proxy, an instruction to perform a session reattachment from the database server; means for establishing a second TCP network connection with the database server through a second reverse proxy; means for transmitting a session reattachment request including the reattachment token through the second reverse proxy; and means for moving the database session from the first TCP network connection to the second TCP network connection.

Some embodiments comprise: means for establishing a database session with a database client, including a session state, for a first Transmission Control Protocol ("TCP") network connection through a first reverse proxy; means for transmitting a reattachment token to the database client through the first reverse proxy; means for receiving a database operation request from the database client through the first reverse proxy; before or during execution of the database operation request, including any updates to the session state, means for receiving an indication from the cloud computing database infrastructure that the first reverse proxy will be terminated after a reattachment window; means for instructing, through the first reverse proxy, the database client to perform a session reattachment; means for receiving, from the database client, a session reattachment request, including the reattachment token, for a second TCP network connection through a second reverse proxy; means for verifying the reattachment token; and means for resuming the database session with the database client, including the updated session state, for the second TCP network connection.

Some technical advantages of some embodiments disclosed herein are improved systems and methods to provide database reattachment to preserve server session state in a secure, automatic, and efficient manner.

BRIEF DESCRIPTION OF THE DRAWINGS

FIG. 12 is a portion of a session database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figures 1A, 1B:
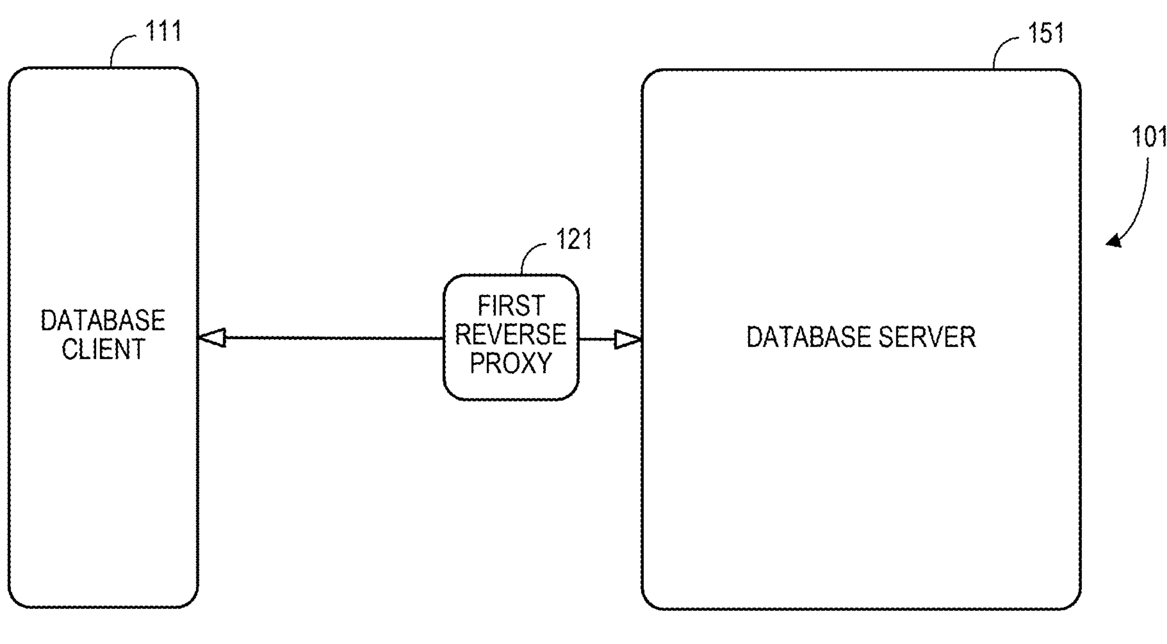
FIGS. 1A through 1D represent a traditional database client-server system.
Figure 1C:
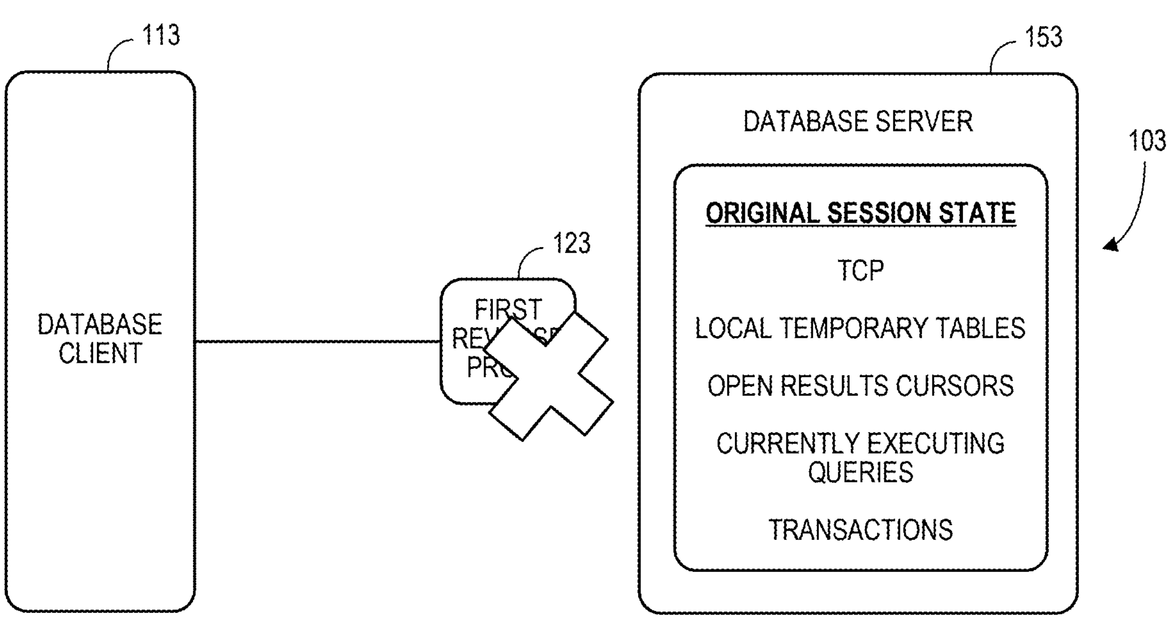
Figure 1D:
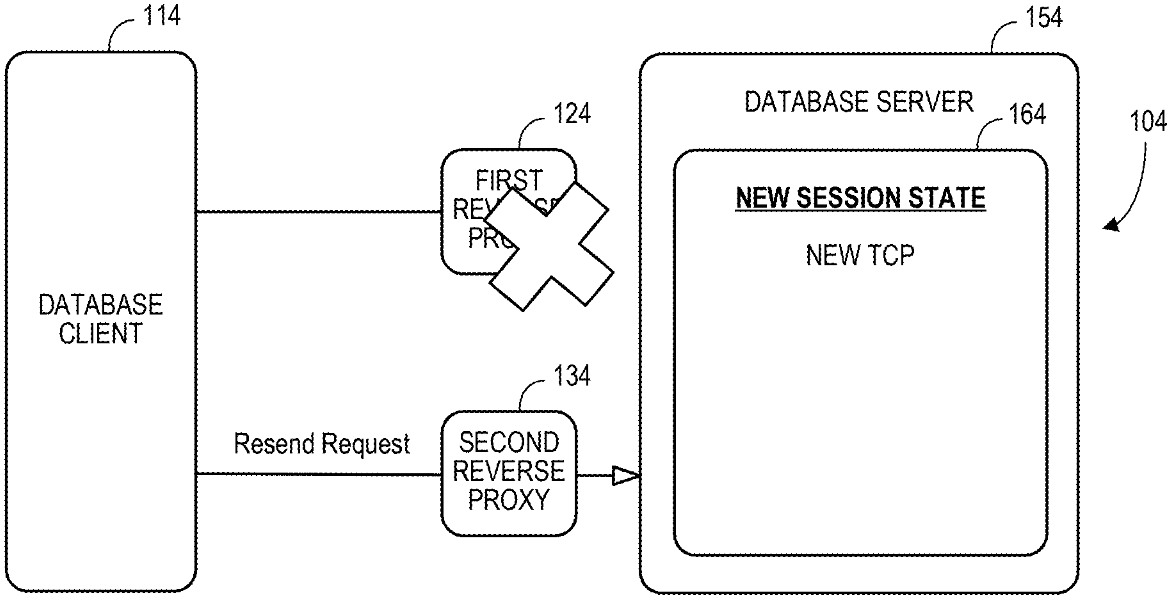
Figure 2A:
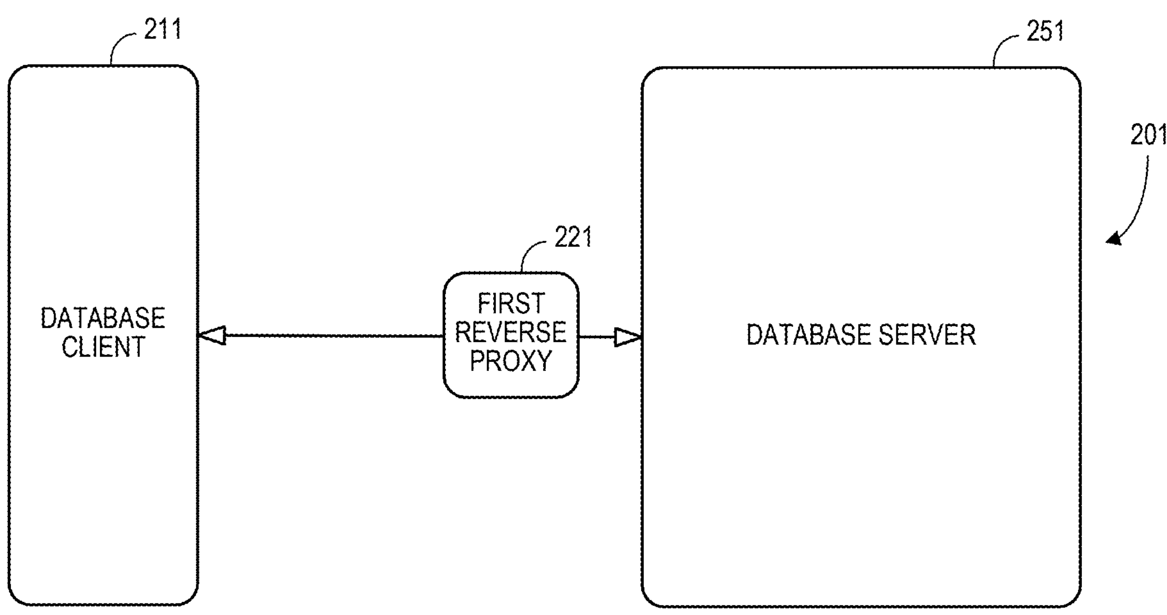
FIGS. 2A through 2E represent a database reattachment system infrastructure in accordance with some embodiments.
Figure 2B:
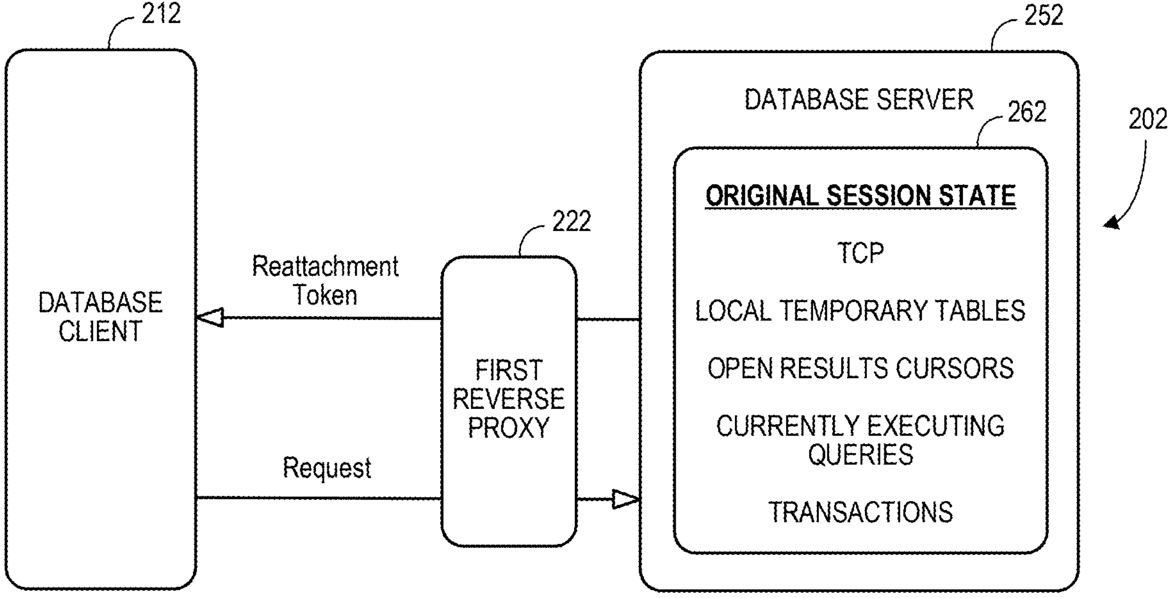
Figure 2C:
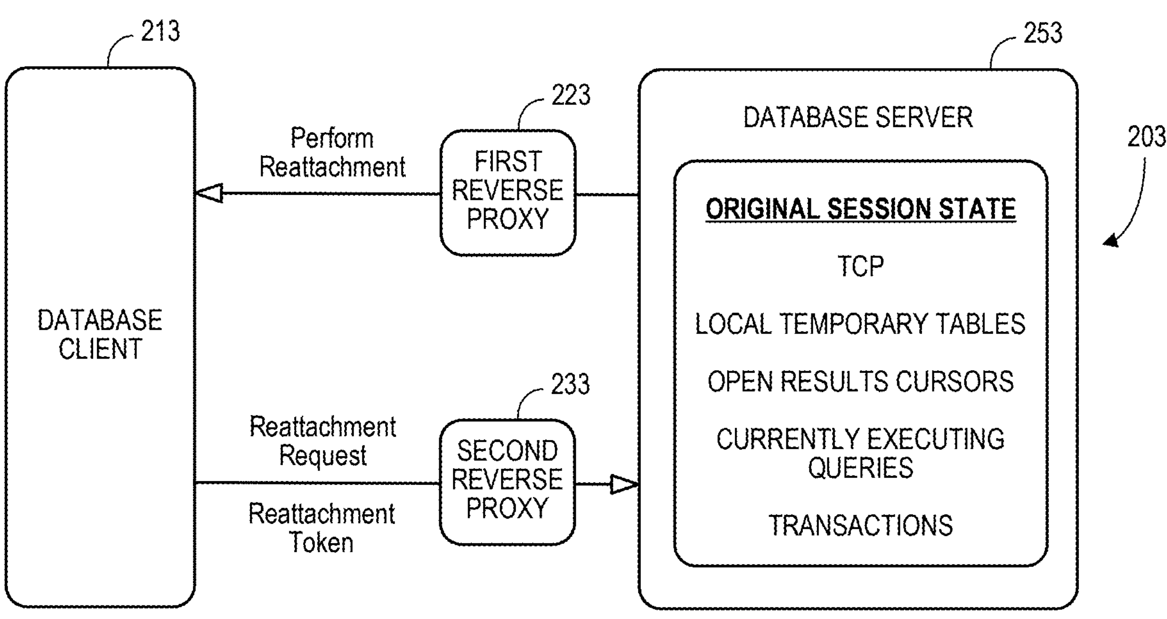
Figure 2D:
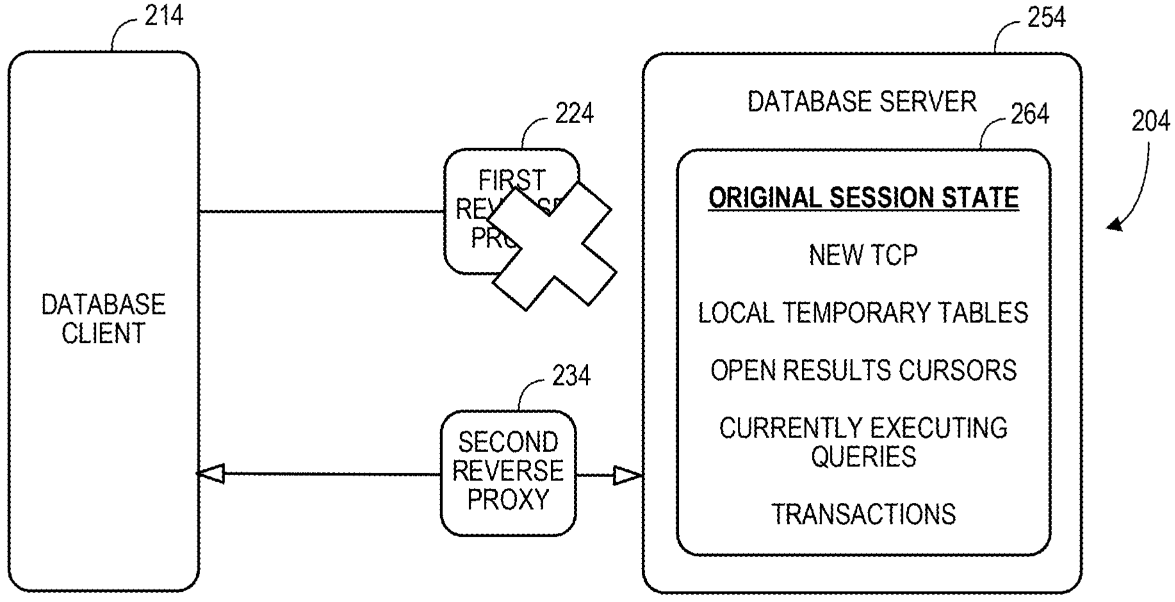

To address these issues, FIGS. 2A through 2E represent a high-level block diagram of a database reattachment system infrastructure according to some embodiments. In particular, FIG. 2A is a system 201 in which a database client 211 establishes a TCP connection with a database server 251 through a first reverse proxy 221. FIG. 2B is a system 202 in which a database client 212 receives a reattachment token through such a connection and transmits a request to a database server 252 through a first reverse proxy 222. The request might comprise, for example, a simple request (taking only a few seconds or minutes to respond), a long-running request (taking many hours to respond), a transaction (e.g., a series of related requests), etc. While responding to the request, the database server 252 may update an original session state 262 containing, for example, information about the TCP connection, local temporary tables, open results in cursors, current executing queries, transactions, etc. FIG. 2C is a system 203 in which a database server 253 determines that the first reverse proxy 223 is going to become unavailable (e.g., when a cloud provider is about to perform maintenance) and instructs a database client 213 to perform a reattachment. As a result, the database client 213 establishes a new TCP connection and then transmits a reattachment request, including the reattachment token, to the database server 253 through a second reverse proxy 233. As shown by the system 204 of FIG. 2D, a database server 254 can continue executing the previous request using the original session state 264 (including updated information about the new TCP connection) without re-starting—avoiding any delay in a response request. That is, embodiments may help prevent the loss of database session states during intentional cloud maintenance operations and elasticity operations on reverse proxies in a cloud infrastructure. Another advantage of session reattachment is unrelated to performance: applications do not get errors in cases where they previously would have. Without session reattachment, if a proxy goes down—especially while there is a transaction is in progress (e.g., uncommitted inserted rows), the application would always get a "connection down" error. Also, without session reattachment an application would get an error when attempting to fetch more rows when a proxy went down with no transaction in progress but in the middle of fetching many rows from a large result set (e.g., thousands or millions of rows).

Figure 2E:
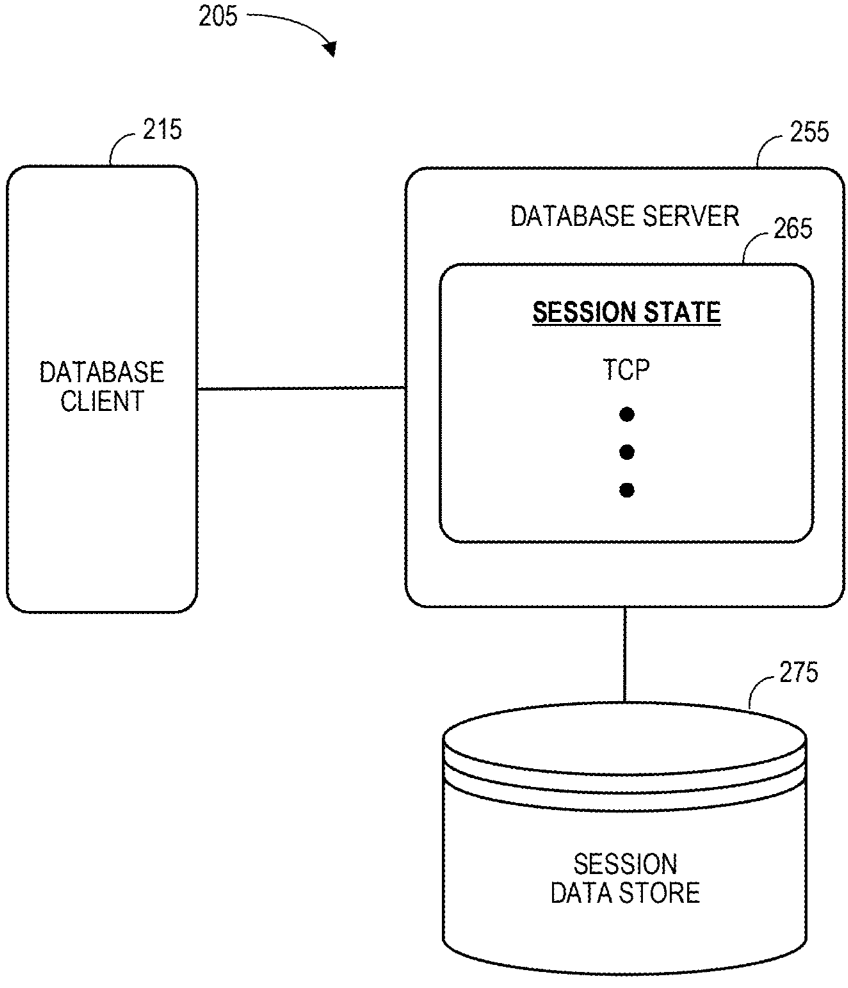

FIG. 2E is a system 205 that includes a database client 215 that exchanges information with a database server 255. The database server 255 might be associated with, for example, an SAP™ HANA® Cloud in-memory, column-oriented, relational database management system that responds to requests from applications. Moreover, the database server 255 may establish a session state 265 when responding to a request and maintain a session data store 275. Note that in some embodiments, a reattachment token is internally generated by the server on a per-session basis (and there is no way for a client to generate it). In this context, the "session" is the object that manages database communication with the client for a database connection. As used herein, devices, including those associated with the system 205 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The database server 255 may store information into and/or retrieve information from various data stores (e.g., the session data store 275), which may be locally stored or reside remote from the database server 255. Although a single database server 255 is shown in FIG. 2, any number of such devices may be included. Moreover, various devices described herein might be combined according to embodiments of the present invention. For example, in some embodiments, the session data store 275 and the database server 255 might comprise a single apparatus. The system 205 functions may be performed by a constellation of networked apparatuses, such as in a distributed processing or cloud-based infrastructure. In some cases, the database server 255 may process information associated with a number of different customers or tenants.

An enterprise may access the system 205 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify configuration information about a computing environment infrastructure) and/or provide or receive automatically generated recommendations, alerts, summaries, or results associated with the system 205.

Figure 3:
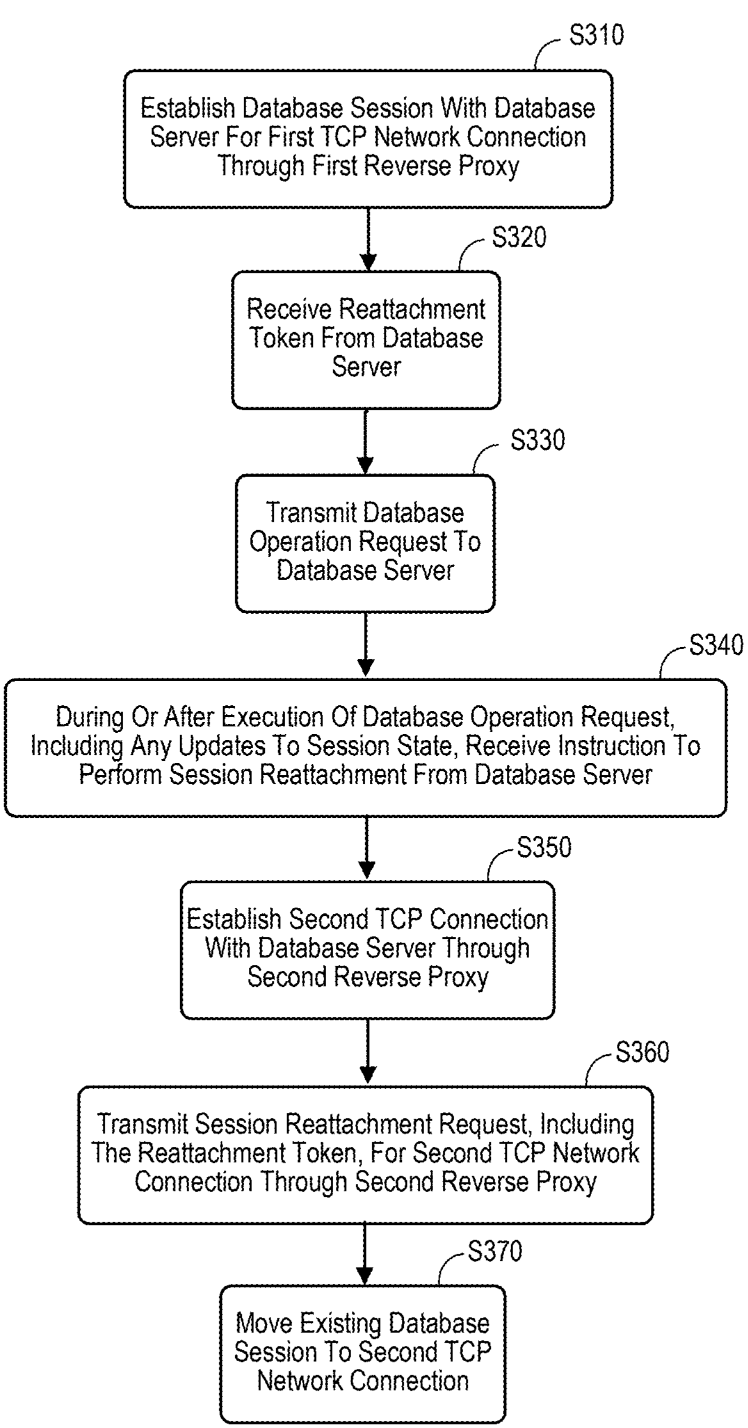
FIG. 3 is a database reattachment client method according to some embodiments.

FIG. 3 is a method that might be performed by the database client 215 described with respect to FIG. 2E according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, the database client may establish a database session with a database server for a first TCP network connection through a first reverse proxy. As used herein, the phrase "TCP" may refer to a communications standard for delivering data and messages through networks (e.g., to deliver data in digital network communications such as the internet). Moreover, the phrase "reverse proxy" might refer to a server that acts as an intermediary between a client and a database server. When a client requests information from a database, the client connects with the reverse proxy instead of the database server. The reverse proxy can then forward the request to the database server, retrieve the information, and send it back to the client.

At S320, the database client receives a reattachment token from the database server through the first reverse proxy. The reattachment token might comprise, for example, a Java Script Object Notation ("JSON") Web Token ("JWT") associated with an open standard (the Internet Engineering Task Force ("IETF") Request For Comment ("RFC") 7519) that defines a compact and self-contained way to securely transmit information between parties as a JSON object. According to some embodiments, the reattachment token may be a binary hashed value built from values known only to the database server's session object. According to some embodiments, this binary hashed value is generated with enough bits to be considered cryptographically complex (such that there is no reasonable way to generate the hash outside of the database server within the lifetime of the connection). All information transmitted between the database client and server might be done, for example, over a secure Transport Layer Security ("TLS") encrypted connection (so the binary data does not require any special handling to be securely transmitted).

At S330, the database client transmits a database operation request to the database server through the first reverse proxy. During or after execution of the database operation request, including any updates to a session state, at S340 the database client receives, through the first reverse proxy, an instruction to perform a session reattachment from the database server. The session state might include, for example, local temporary tables, open result cursors, currently executing queries, transactions, etc.

At S350, the client establishes a second TCP network connection with the database server through a second reverse proxy and transmits a session reattachment request (including the reattachment token) through the second reverse proxy at S360. At S370, the database session is moved from the first TCP network connection to the second TCP network connection. Note that the second TCP network connection might be established before or after the first TCP network connection is dropped.

In some cases, the database server may decide to perform a "reattach after response" (e.g., as described in connection with FIG. 8) based on a periodic check. In other cases, the database server may decide to perform a "reattach during execution" (e.g., as described in connection with FIG. 9) if execution of the database operation request will not finish within the reattachment window. A main difference between "reattach after response" and "reattach during execution" is that for "reattach after response," the original request has been completed and the full response is sent back to the client before the client starts the reattach. For "reattach during execution," the original request is still running at the point the server instructs the client to do the reattach (so this intermediate reply is just the server instructing the client to do the reattach). The client and server complete the entire reattach, and then the client waits for the full response from the still running request.

Figure 4:
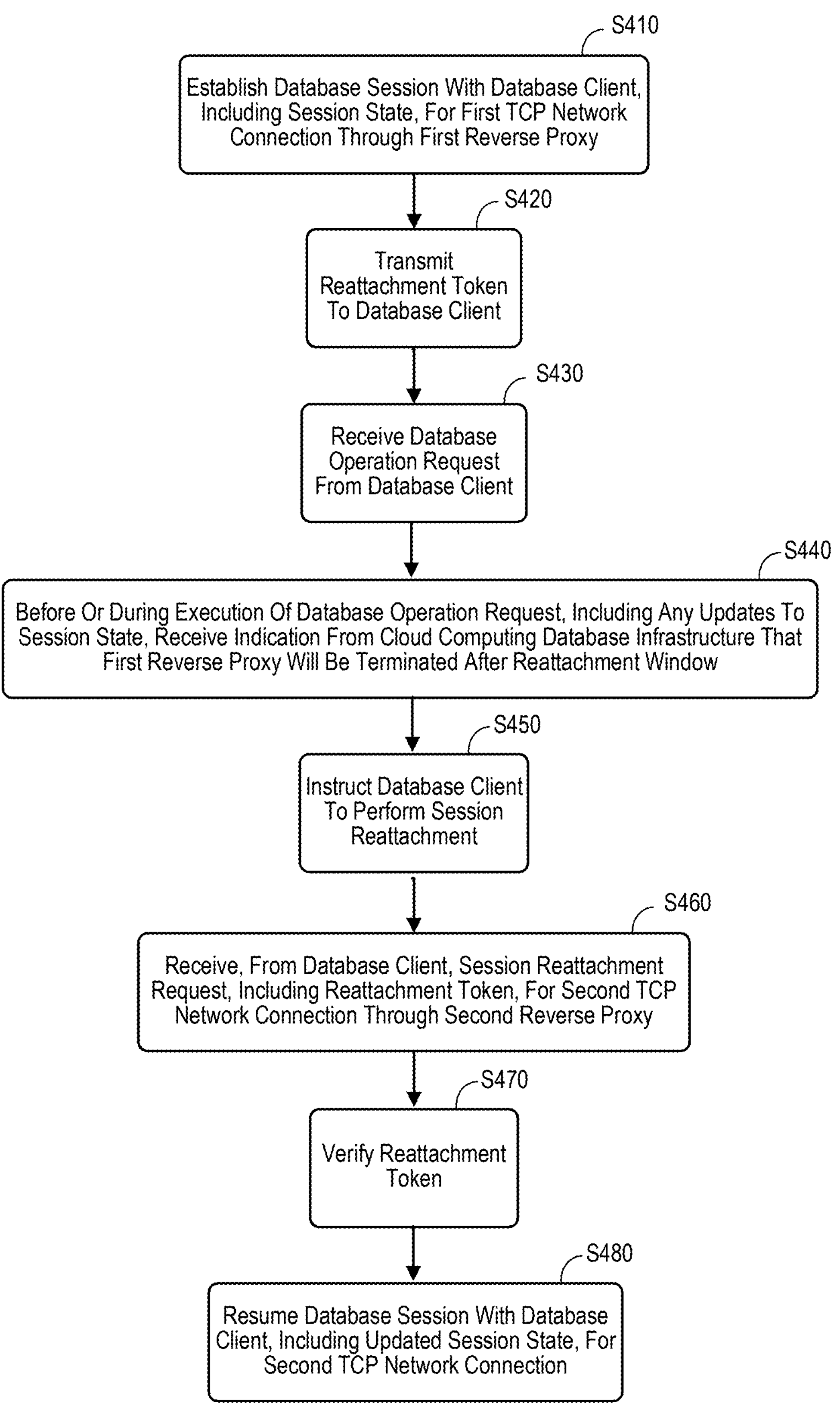
FIG. 4 is a database reattachment server method in accordance with some embodiments.

FIG. 4 is a method that might be performed by the database server 255 described with respect to FIG. 2E in accordance with some embodiments. At S410, the database server establishes a database session with a database client, including a session state, for a first TCP network connection through a first reverse proxy. At S420, the server transmits a reattachment token to the database client through the first reverse proxy and receives a database operation request from the database client through the first reverse proxy at S430. Before or during execution of the database operation request, including any updates to the session state, at S440 the server receives an indication from the cloud computing database infrastructure that the first reverse proxy will be terminated after a reattachment window. The first reverse proxy might be terminated, for example, because of a cloud configuration change, service maintenance, or elasticity operations in a cloud edge layer.

At S450, the database server instructs, through the first reverse proxy, the database client to perform a session reattachment. At S460, the database server receives, from the database client, a session reattachment request, including the reattachment token, for a second TCP network connection through a second reverse proxy. The server can then verify the reattachment token at S470 and resume the database session with the database client, including the updated session state, for the second TCP network connection at S480. Note that the second TCP network connection may be created before the server receives the session reattach request.

Figure 5:
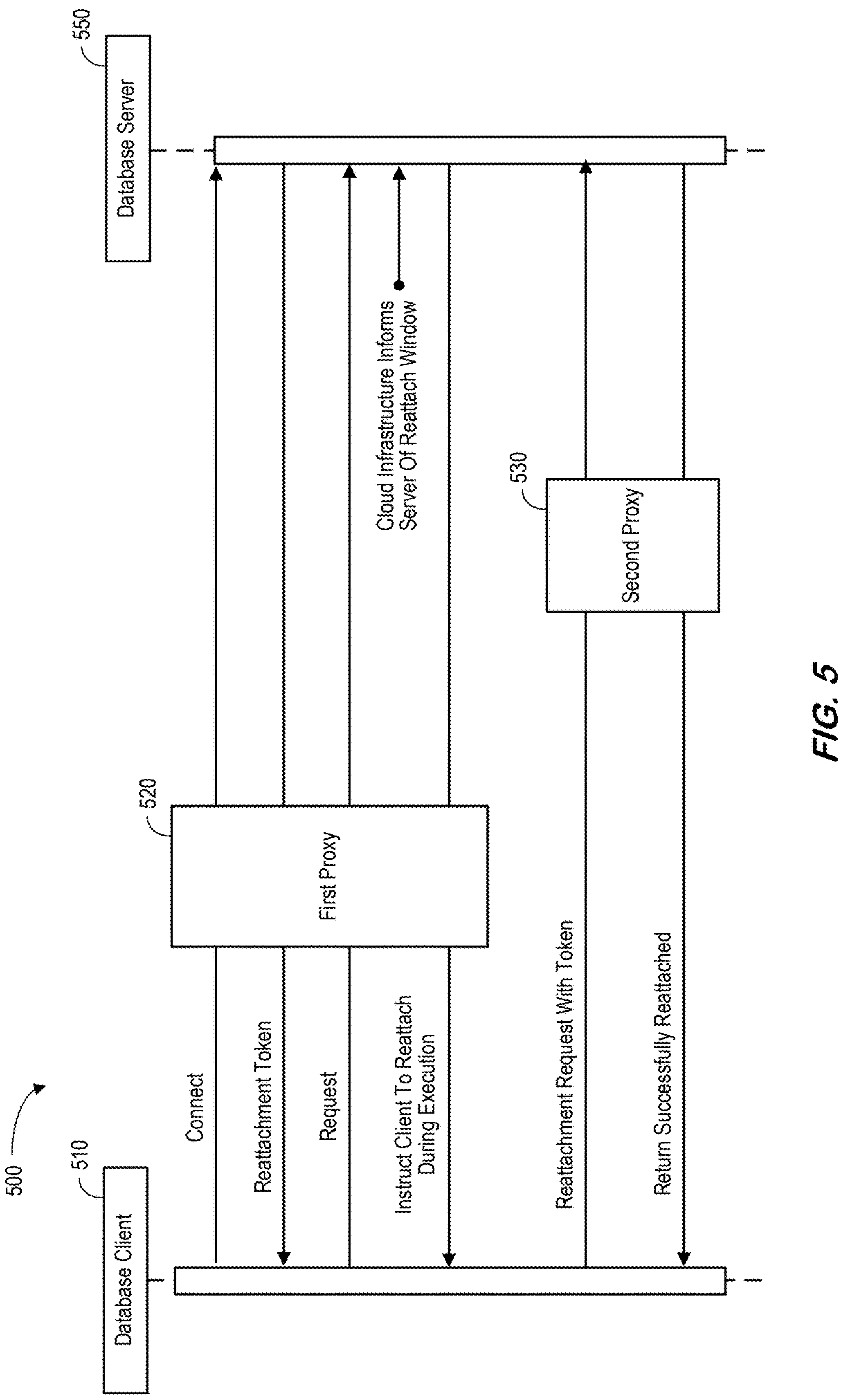
FIG. 5 is a reattach during execution information flow according to some embodiments.

FIG. 5 is a reattach during execution information flow 500 according to some embodiments. In particular, a database client 510 connects to a database server 550 via a first proxy 520. The database server 550 establishes a database session for that connection (including a session state) and returns a reattachment token associated with the session to the first proxy 520. The client 510 can then send a database request to the database server 550 which begins executing the request. If the server 550 determines that the first proxy 520 will be drained, it instructs the database client 510 to perform a reattach during execution. Responsive to the instruction, the database client 510 re-attaches to the database server 550 (including sending the reattach token) via a second proxy 530. The database server 550 moves the session to the second proxy 530 and continues executing the request in accordance with the prior session state updated with the re-attached connection via the second proxy 530. Once the execution finishes, the database server 550 sends the request result to the client 510.

Note that database client Structured Query Language ("SQL") connections to a database server may always be expected to be available without network TCP interruption to complete requested SQL operations. The database server session state for these SQL connections (e.g., information kept about local temporary tables, open result cursors, currently executing queries, transactions, etc.) is bound to the lifetime of the underlying TCP network connection. When the TCP network connection is interrupted for any reason, without reattachment the session state is typically removed from the database server and software applications may be required to restart long-running transactions or queries.

Network interruptions can happen both intentionally and unintentionally when the database server is hosted in a cloud environment where TCP connections are routed over reverse proxies in the cloud edge layer nodes. If a reverse proxy needs to be intentionally shut down (e.g., to perform service maintenance or elasticity operations in the cloud edge layer) all open TCP connections handled by the reverse proxies are interrupted typically causing the associated database sessions to be discarded by the database server.

To avoid this, in some embodiments described herein the cloud infrastructure informs the database server that a specific reverse proxy service needs to be "drained" (e.g., prepared for termination) due to a requested cloud configuration change or elasticity operation. In response, the database server informs the currently connected database clients to perform a session reattachment with a new TCP network connection via a new reverse proxy and maintains the session state for all active database client connections.

When a reverse proxy node needs to be drained, it may be retained for a time long enough for the database clients to reattach their associated SQL connections. After the termination of the retention period (or "reattach window"), the remaining database client connections are forcefully dropped. Defining the length of the reattach window has an impact on determining if active database requests are aborted. Single requests to the database (e.g., a query) can take several hours before a response is sent from the server to the client. Note that a single Long-Running Request ("LRR") may be different from a transaction (which consists of multiple requests).

Due to a common drain time limit in public cloud hyperscaler environments, the shutdown grace period might be limited to one hour. However, some applications may have LRRs that can execute for a substantial period of time (e.g., over 24 hours). A session reattachment during the execution of these requests should, if possible, retain all of these database sessions.

SQL connections are request/response based, a suitable time to reattach may be between a response from the server and the next request. In the time window between the response and the next request, the end of a response or the beginning of a request may be the most suitable to perform a reattachment.

It is also possible to reattach in the middle of a request/response cycle (when the server is executing and the client is waiting for response) which could help with long-running statements (which are longer than the time window). Those long-running statements are mostly the ones where it is expensive to re-execute and a cancellation could be perceived as downtime.

Note that not all request types may be suitable to trigger reattachment. According to some embodiments, any connection-even when not idle-will be dropped if it does not perform a matching request within the time window. If executed in the context of an application call, the reattach may prolong the response time for the request. Note that a single request/response roundtrip is not equal to a logical SQL transaction. A transaction may consist of multiple requests and if preconditions are met it is possible to reattach even in the middle of a long lasting write transaction.

In various embodiment, either the client or server might initiate reattachment. Starting the reattachment may require monitoring for some kind of specific event (that is, the system should not reattach with every request). This might be a time threshold or an explicit event from a third party. If the client is to initiate reattachment, it will require context information from the server and infrastructure. This information can be sent to the client during the connect. If it needs to be changed, a new configuration may be provided, which is on a single thread only possible within an application call.

The server, on the other hand, can receive an event depending on the current situation. It can either be a static interval or the server may be triggered by a dedicated service that monitors the edge layer and decides that connections need to be reattached. With the decision on the server side, embodiments may change the trigger event types without updating client libraries.

When a new TCP connection is created via a different proxy, the old connection needs to be closed. Some embodiments retain the old TCP connection until the session takeover is finished. This has the benefit of being able to handle the lifetime of a session. As long as the old TCP connection exists, the client is still alive and the session can be kept on the server (and no timeouts are required). A drop of the session due to issues during creation of a new TCP connection is avoided if the old connection still exists. The retained connection could also be revived when a reattach failed. Note that such an approach could temporarily result in twice the number of TCP connections that the edge layer and the database node need to manage.

When a SQL connection needs to be reattached, the session may already be authenticated. But the credentials (e.g., password) might change before the reattachment is triggered. To prevent problems during reattachment, authentication may be replaced by an equivalent check, such as a token that is sent before the reattach request from the server to the client.

To reduce request/response delay and the time during which the server must retain the session, a sufficient number of alternative active proxy nodes should be available. Before a proxy node can be drained, another node might be started to handle the new connections for the reattachments. Note that a proxy node to be drained may be removed from the endpoint list of the services after the new proxy instances are started. Depending on the strategy that is implemented, this requirement may increase the edge node resources during the grace period.

Figure 6:
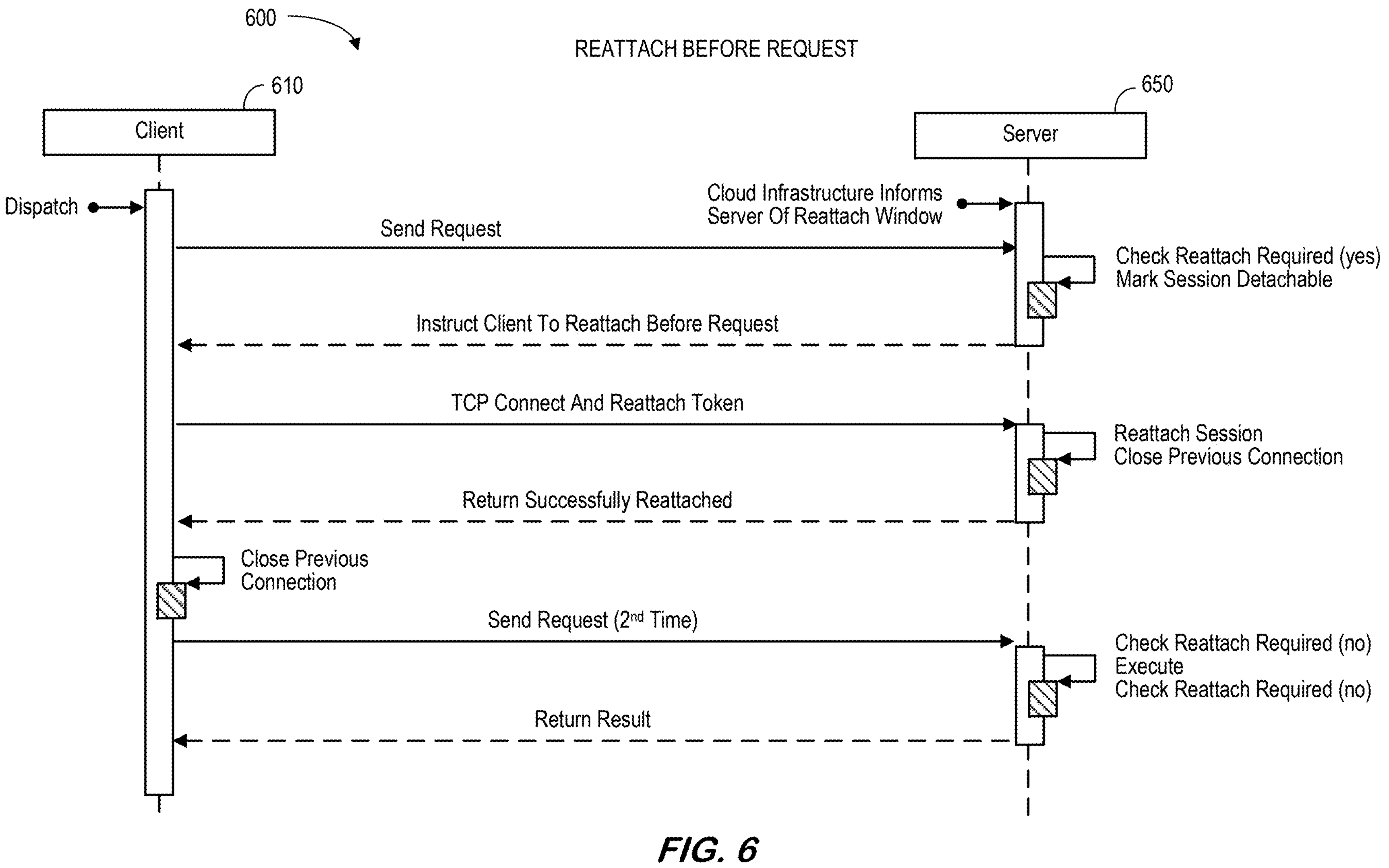
FIG. 6 is a reattach before request execution data flow in accordance with some embodiments.

FIG. 6 is a "reattach before request" execution data flow 600 between a database client 610 and server 650 in accordance with some embodiments. With the check for reattachment during the receive portion of the request on the server 650, embodiments may ensure that a request is not aborted if it does not exceed the time window. If a connection is marked for reattachment when the request enters the server 650, the request is not executed by the server, but instead the server immediately instructs the client to reattach before request. The session is marked as detachable, but the TCP connection is still open. The client 610 creates a second TCP connection and provides the reattach token during the connect request. This will associate the session with the new TCP connection and return that that the reattach was successful via this channel. The server 650 subsequently closes the old TCP connection. After the connection is reattached, the client 610 also closes the previous TCP connection and sends the request message for the second time for execution. Note that not all request types may be suitable for reattachment. In some embodiments the request message contains data that is read on the client 610 side from a source that cannot be read again in the second request. This can be mitigated by retaining the whole request on the client 610 side until the response is received (or the request is appropriately marked).

Figure 7:
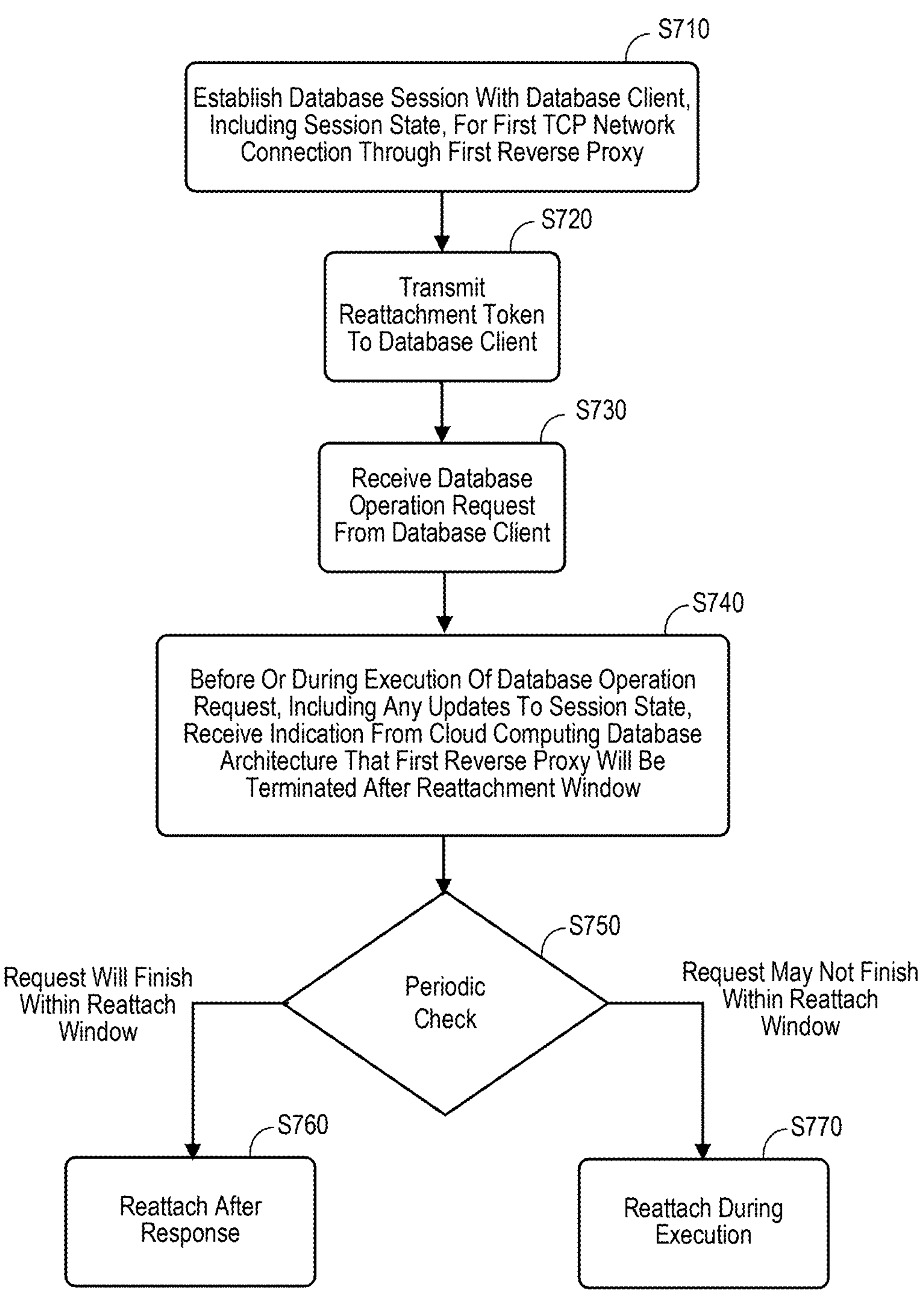
FIG. 7 is a method in accordance with some embodiments.

FIG. 7 is a method in accordance with some embodiments. At S710, a database server establishes a database session with a database client, including a session state, for a first TCP network connection through a first reverse proxy. At S720, the server transmits a reattachment token to the database client through the first reverse proxy and receives a database operation request from the database client through the first reverse proxy at S730. Before or during execution of the database operation request, including any updates to the session state, at S740 the server receives an indication from the cloud computing database infrastructure that the first reverse proxy will be terminated after a reattachment window (e.g., due to a cloud configuration change, service maintenance, or elasticity operations in a cloud edge layer).

The database server then has two scenarios of session state to consider for reattachment. If execution of the request will finish within the reattach window at S750 (such as a proxy drain time), then the system performs a "reattach after response" (described with respect to FIG. 8) at S760. If execution of the request may not finish within the reattach window at S750, then the system performs a "reattach during execution" (described with respect to FIG. 9) at S770.

In some embodiments, the decision at S750 is periodically checked (e.g., every two minutes or so) of a single request execution. If at that check, the request is still in execution and the connection is in the reattachment window, then a "reattach during execution" is performed. To do so, the database client uses the reattach token to start a new network TCP connection and requests a reattach to the database server. The database server verifies the reattach token and then allows the database client to resume its existing session, without losing session state. Otherwise, when the end of request is reached within the reattachment window, a "reattach after response" is performed. The "reattach after response" case might be a short running request (e.g., less than about two minutes) or the cloud infrastructure may have notified the server about the reattachment window near the end of a long-running request (e.g., after the periodic two-minute check).

Figure 8:
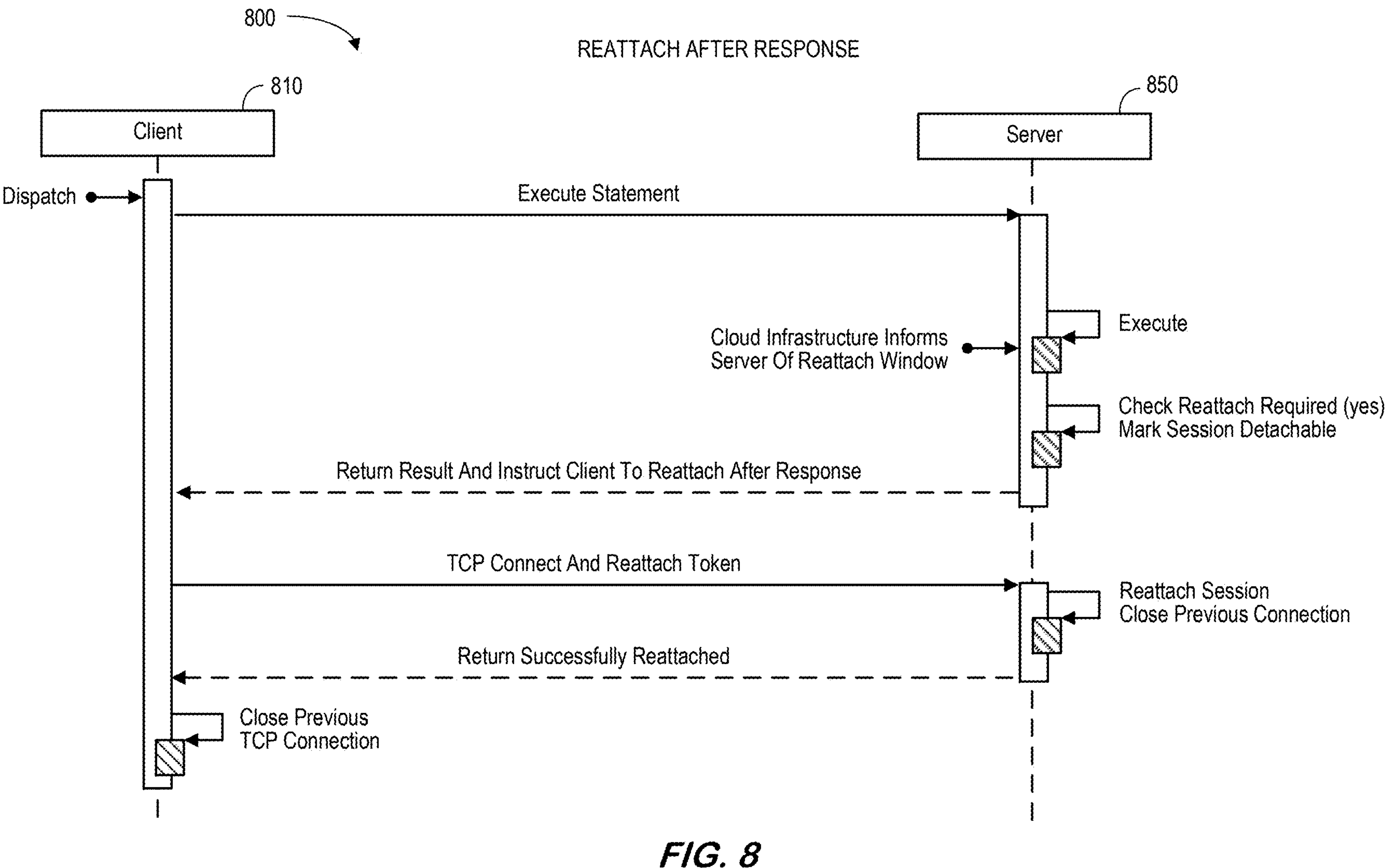
FIG. 8 is a reattach after response data flow according to some embodiments.

FIG. 8 is a reattach after response data flow 800 between a database client 810 and server 850 according to some embodiments. In some embodiments, the server 850 checks for "reattach required" on short requests only at the end of a request. For long-running requests, the sever 850 may check for "reattach required" every few minutes (for "reattach during execution") and at the end of the request. If the event to reattach is received on the server 850 before or during the processing of a request, the server 850 returns a result and instructs client to reattach after response. A TCP connect and reattach token may be sent from the client 810 to the server 850 (to establish a new TCP/IP connection but not a new database connection/session). The session is marked as detachable, but the TCP connection is still open. A close of the previous TCP connection discards the session (on both the client 810 and server 850). After receiving the reattach request, the client 810 creates a second TCP connection providing the reattach token and closes the previous TCP connection after the return successfully reattached confirmation from the server 850.

Figure 9:
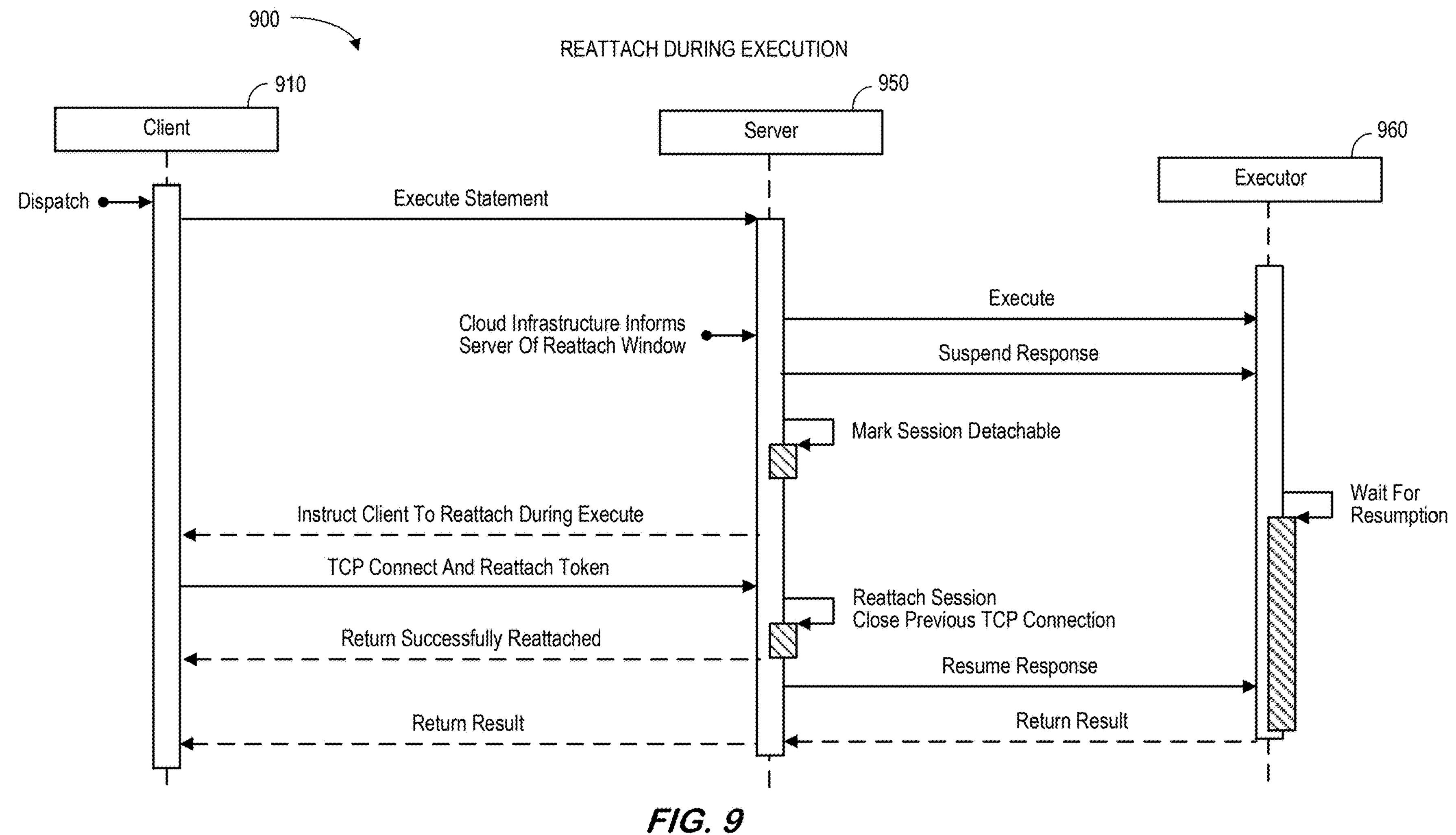
FIG. 9 is a reattach during execution data flow in accordance with some embodiments.

FIG. 9 is a reattach during execution data flow 900 between a database client 910, server 950, and executor 960 in accordance with some embodiments. An interval or event driven check for the need to reattach (independent from the client 910 and server 950 request flow) triggers the operation on the server 950 side for connections that are currently processing a request. In case of the event, the server 950 prevents the session and the executor 960 from sending data back to the client 910 until a new TCP connection is established. The server 950 then sends an intermediate response message to the client 910 with the request to perform the reattachment. After the client 910 creates a second TCP connection and closes the previous one, it listens for a response to the previously sent request.

Figure 10:
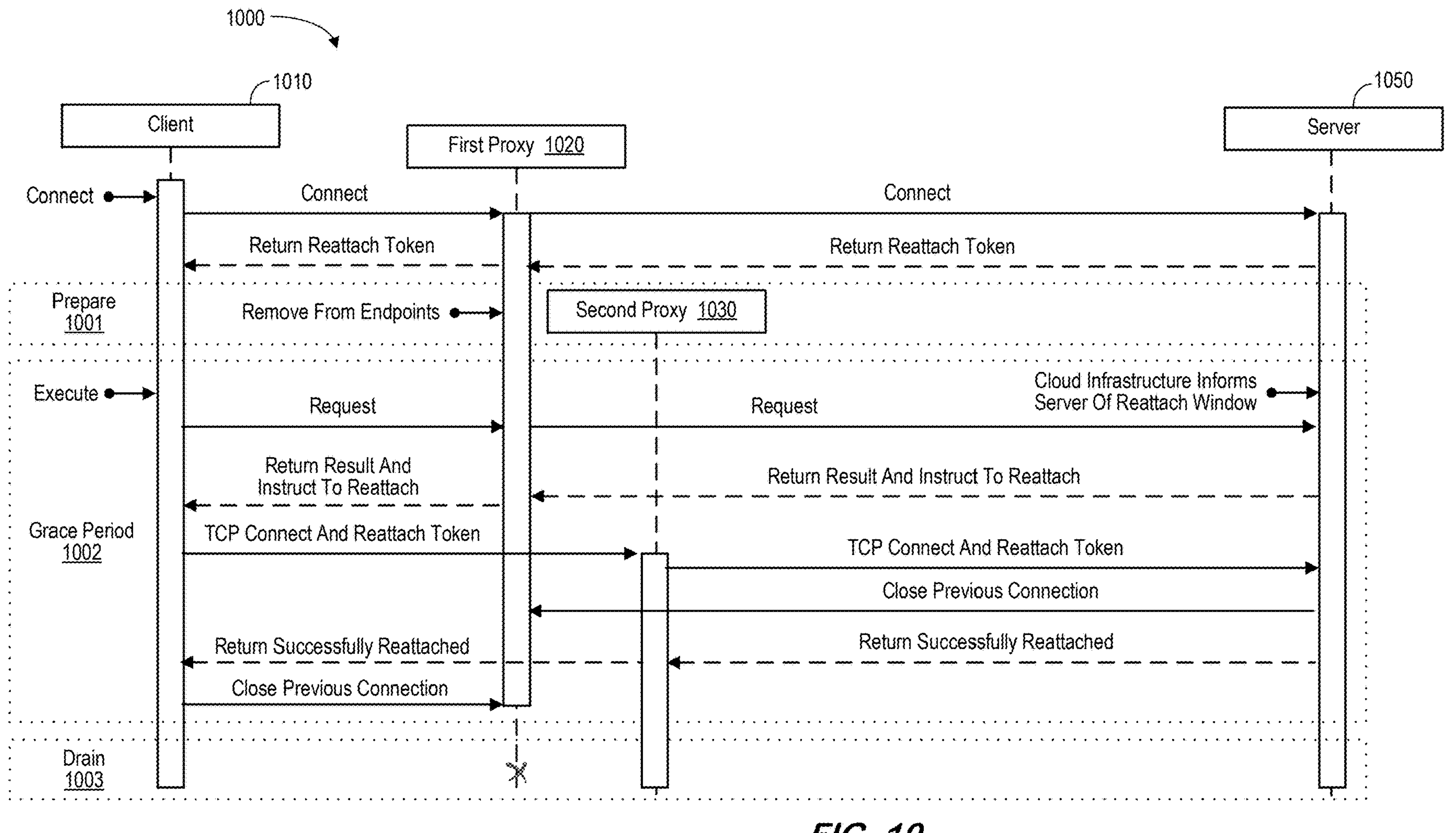
FIG. 10 is a proxy drain information flow according to some embodiments.

FIG. 10 is a proxy drain information flow 1000 between a database client 1010, first proxy 1020, second proxy 1030 and server 1050 according to some embodiments. A proxy can be removed by performing the three phases depicted in FIG. 10: a preparation phase 1001, a grace period phase 1002, and a drain phase 1003. In the preparation phase 1001, optionally alternative proxies are started to handle new TCP connections. It may be ensured that at least one node is still available. During the preparation phase 1001, the proxy may be deleted from the list of endpoints (so that new connections are not routed via this node). The grace period phase 1002 is essentially an idle time window where the client 1010 connections can be reattached. This time can be shortened by monitoring the incoming connections of the proxy. The drain phase 1003 is the final shutdown of the node (all remaining connections are dropped immediately).

There are several reasons why a TCP connection might not be reestablished. In such cases, the session may be retained until the previous TCP connection is closed. For example, a connection might not be reestablished due to restricting an allow list in the proxy configuration. If the client 1010 IP is not allowed to connect anymore, all TCP connections will be rejected. As another example, a connection might not be reestablished because of a maximum number of connections per backend or proxy. In this case, TCP connections may be rejected if the maximum number is reached. The reattach competes with new connections and other reattach attempts (e.g., there are too few edge proxies or there is a Denial of Service ("DoS") attack). As still another example, a connection might not be reestablished due to a high load on the client 1010, proxies 1020, 1030, or server 1050. If the nodes are under pressure, there might not be enough resources to reattach in time. This may be mitigated by prolonging the session retention time and/or reestablishing the new TCP connection before dropping the old one.

Figure 11:
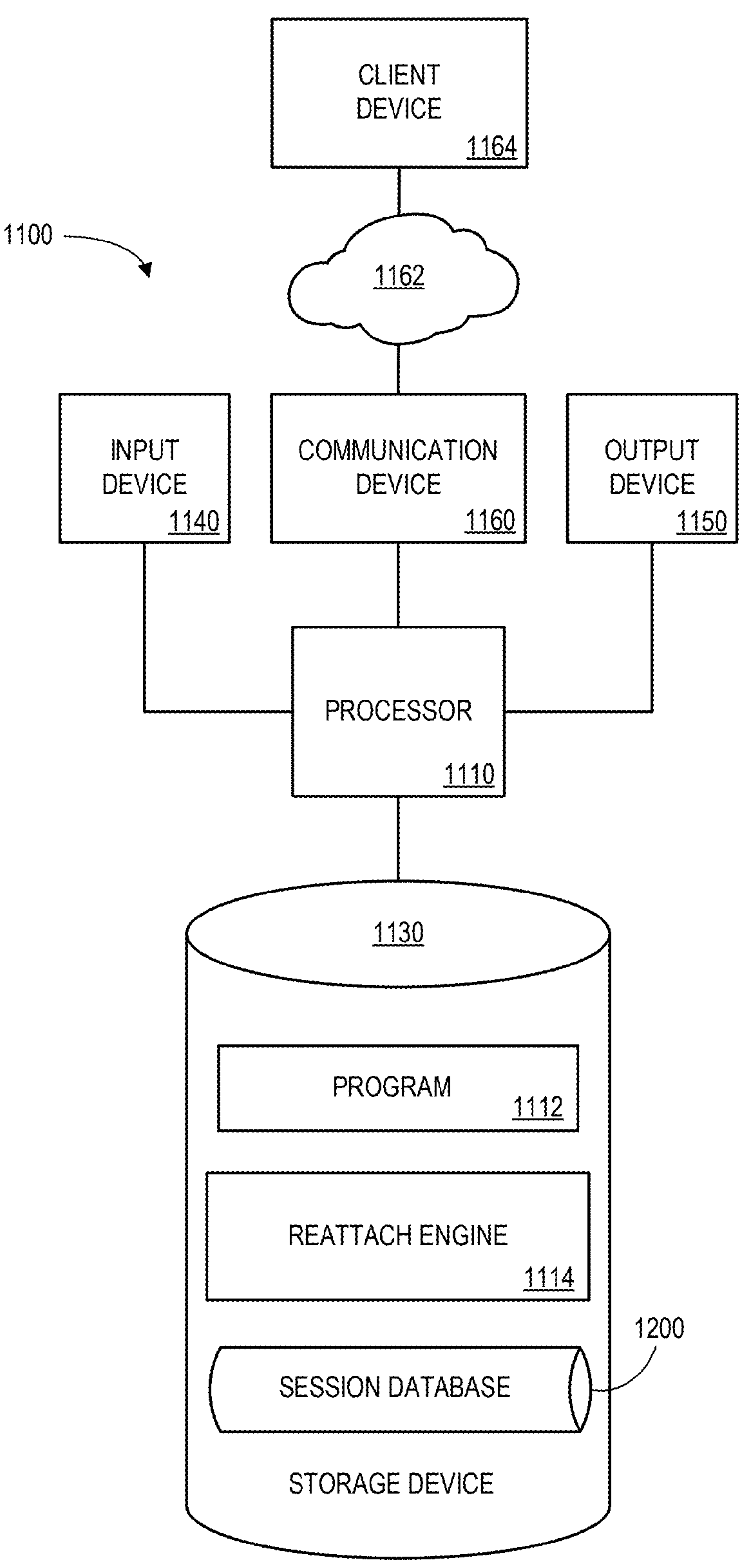
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the server 255 of FIG. 2E (and/or any other system described herein). The platform 1100 comprises a processor 1110, such as one or more commercially available Central Processing Units ("CPUs") in the form of one-chip microprocessors, coupled to a communication device 1160 configured to communicate via a communication network 1162 (e.g., a distributed computer network). The communication device 1160 may be used to communicate, for example, with one or more user devices 1164 via the communication network 1162. The platform 1100 further includes an input device 1140 (e.g., a computer mouse and/or keyboard to input data mappings, cloud configurations, etc.) and an output device 1150 (e.g., a computer monitor to render a display, transmit recommendations, charts, alerts, and/or reports about a reattachment framework or service, etc.).

The processor 1110 is also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a reattach engine 1114 for controlling the processor 1110. The processor 1110 performs instructions of the programs 1112, 1114, and thereby operates in accordance with any of the embodiments described herein. For example, the processor 1110 may maintain a database session with a database client, including a session state, for a first TCP network connection through a first reverse proxy. A reattachment token is sent to the database client, and a database operation request is received from the database client through the first reverse proxy. Before or during execution of the database operation request (including any updates to the session state) an indication is received by the processor 1110 that the first reverse proxy will be terminated after a reattachment window. The processor 1110 instructs the database client to perform a session reattachment and receives, from the database client, a session reattachment request, including the reattachment token, for a second TCP network connection through a second reverse proxy. The processor 1110 verifies the reattachment token and resumes the database session with the database client, including the updated session state, for the second TCP network connection.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a session database 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Referring to FIG. 12, a table is shown that represents the session database 1200 that may be stored at the platform 1100 according to some embodiments. The table may include, for example, entries identifying database sessions with clients. The table may also define fields 1202, 1204, 1206, 1208 for each of the entries. The fields 1202, 1204, 1206, 1208 may, according to some embodiments, specify: a session identifier 1202, a client identifier 1204, a session state 1206, and TCP connection information 1208. The session database 1200 may be created and updated, for example, when a new database session is established, a proxy needs to be drained, etc.

The session identifier 1202 might be a unique alphanumeric label that is associated with a database session that has been (or is being) established for the client identifier 1204. The session state 1206 might include temporary tables, transaction, open results, etc. The TCP connection information 1208 might include an address and other information about a reverse proxy.

Thus, embodiments may seamlessly reattach client SQL connections to sessions on the server providing for voluntary proxy disruptions without the loss of SQL connections and their associated state. Another use case is the redistribution of permanent connections over available proxy instances when there is too much load on a certain proxy. Embodiments may also be used to address proxy crashes caused by too many processes being created (e.g., due to reconfigurations).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of requests and responses, any of the embodiments described herein could be applied to other types of requests or responses. Moreover, a session reattachment could be associated with a distributed protocol flow for a logical connection between an application with multiple physical connections to multiple database server nodes.

Figure 13:
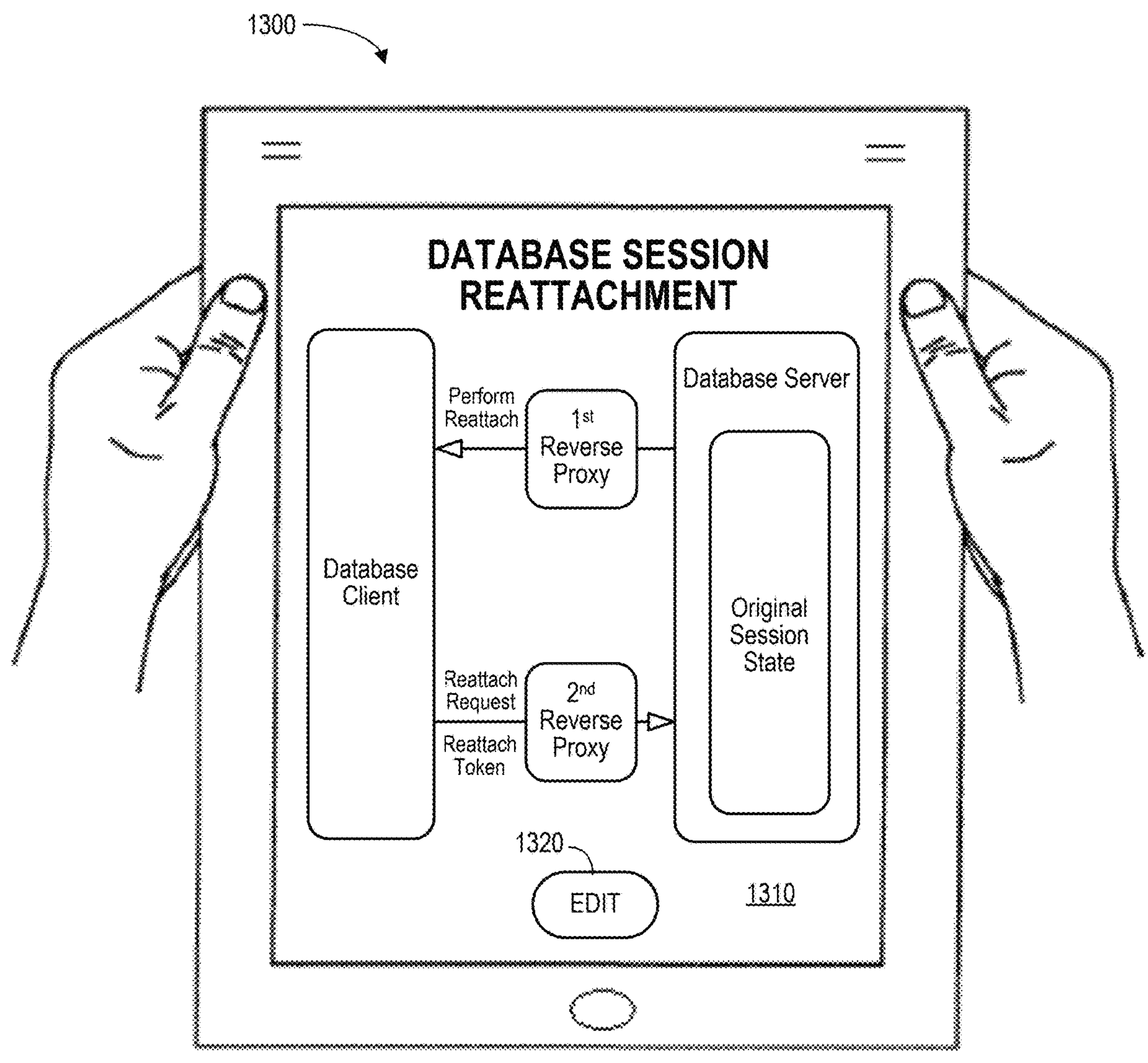
FIG. 13 illustrates a tablet computer database session reattachment display according to some embodiments.

In addition, the displays shown herein are provided only as examples, and any other type of user interface could be implemented. For example, FIG. 13 illustrates a tablet computer 1300 providing a database session reattachment display 1310 according to some embodiments. The database session reattachment display 1310 might be used, for example, to troubleshoot database session reattachment. A user may interact with the display 1310, such as by touching an element of the display 1310 and selecting an "Edit" icon 1320. In this way, the user may see more information change settings for an element of the configuration system or framework.

Figure 14:
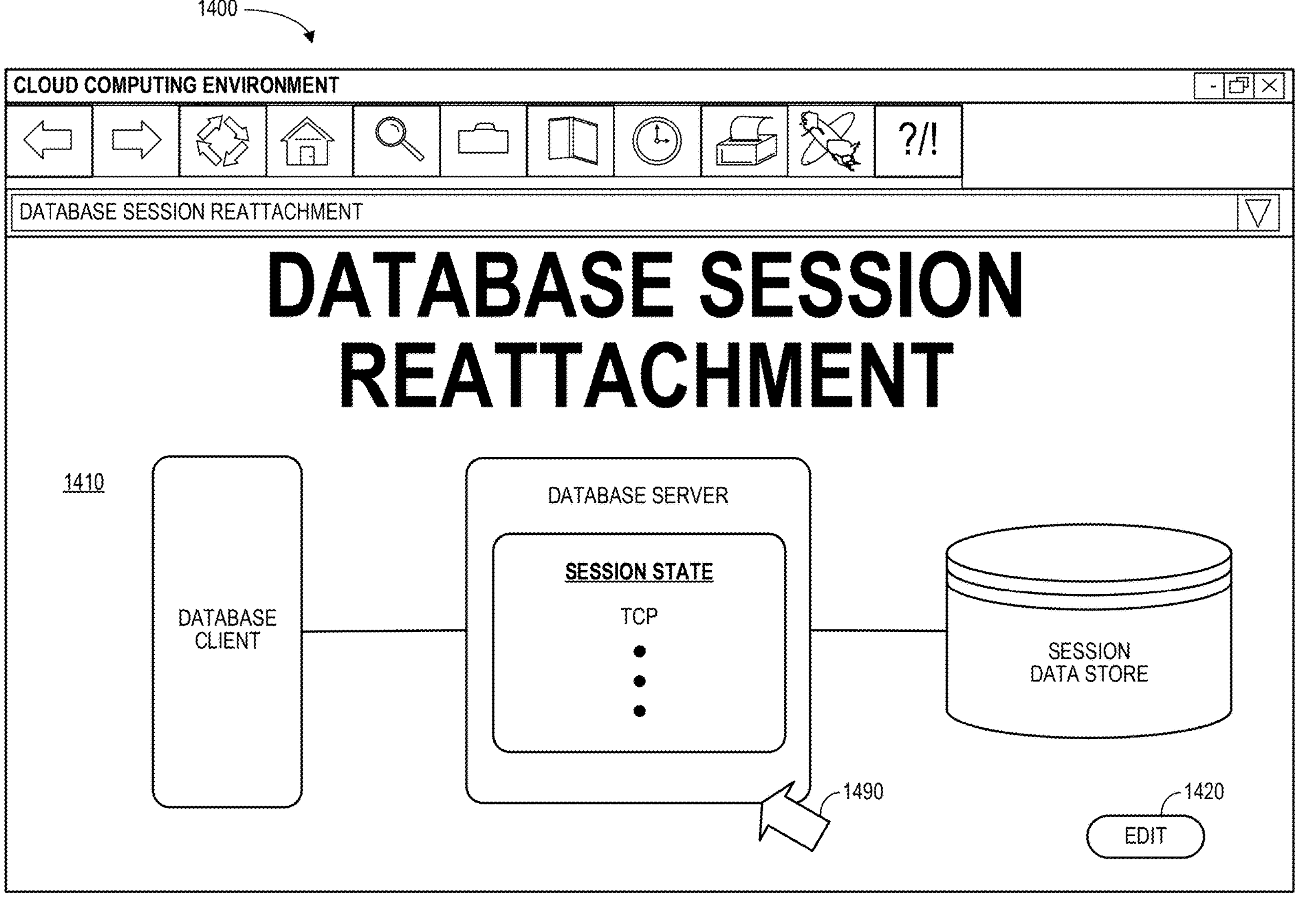
FIG. 14 is a customer-managed database session reattachment operator or administrator display in accordance with some embodiments.

FIG. 14 is an operator or administrator display 1400 in accordance with some embodiments. The display 1400 includes a graphical representation 1410 of a database session reattachment system in accordance with any of the embodiments described herein. Selection of an element on the display 1400 (e.g., via a touchscreen or computer pointer 1490) may result in display of a pop-up window containing more detailed information about that element and/or various options (e.g., to define how reattachments are performed, adjust connections, etc.). Selection of an "Edit" icon 1420 may also let an operator or administrator alter the operation of the system (e.g., to change mapping to a data store, adjust cloud environment properties, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing database infrastructure, comprising:

a database client, including:

a computer processor, and a computer memory storing instructions that, when executed by the computer processor, cause the database client to:

establish a database session with a database server for a first Transmission Control Protocol ("TCP") network connection through a first reverse proxy, receive a reattachment token from the database server through the first reverse proxy, transmit a database operation request to the database server through the first reverse proxy, during or after execution of the database operation request, including any updates to a session state, receive, through the first reverse proxy, an instruction to perform a session reattachment from the database server, establish a second TCP network connection with the database server through a second reverse proxy, transmit a session reattachment request including the reattachment token through the second reverse proxy, and move the database session from the first TCP network connection to the second TCP network connection.

2. The system of claim 1, wherein the session state includes at least one of: (i) local temporary tables, (ii) open result cursors, (iii) currently executing queries, and (iv) transactions.

3. The system of claim 1, further comprising:

the database server to:

establish the database session with the database client, including the session state, for the first TCP network connection through the first reverse proxy, transmit the reattachment token to the database client through the first reverse proxy, receive the database operation request from the database client through the first reverse proxy, before or during execution of the database operation request, including any updates to the session state, receive an indication from the cloud computing database infrastructure that the first reverse proxy will be terminated after a reattachment window, instruct, through the first reverse proxy, the database client to perform the session reattachment, receive, from the database client, the session reattachment request, including the reattachment token, for the second TCP network connection through the second reverse proxy, verify the reattachment token, and resume the database session with the database client, including the updated session state, for the second TCP network connection.

4. The system of claim 3, wherein the database server decides to perform a reattach after response based on a periodic check.

5. The system of claim 4, wherein the reattach after response comprises an original request that has been completed and a full response is sent back to the database client before the database client starts the reattach.

6. The system of claim 3, wherein the database server decides to perform a reattach during execution based on a periodic check.

7. The system of claim 6, wherein the reattach during execution comprises an original request that is still running when the database server instructs the database client to do the reattach.

8. The system of claim 3, wherein the first reverse proxy is terminated because of at least one of: (i) a cloud configuration change, (ii) service maintenance, and (iii) elasticity operations in a cloud edge layer.

9. The system of claim 3, wherein the second TCP network connection is established at least one of: (i) before the first TCP network connection is dropped, and (ii) after the first TCP network connection is dropped.

10. The system of claim 3, wherein the session reattachment is associated with a distributed protocol flow for a logical connection between an application with multiple physical connections to multiple database server nodes.

11. A system associated with a cloud computing database infrastructure, comprising:

a database server, including:

a computer processor, and a computer memory storing instructions that, when executed by the computer processor, cause the database server to:

establish a database session with a database client, including a session state, for a first Transmission Control Protocol ("TCP") network connection through a first reverse proxy, transmit a reattachment token to the database client through the first reverse proxy, receive a database operation request from the database client through the first reverse proxy, before or during execution of the database operation request, including any updates to the session state, receive an indication from the cloud computing database infrastructure that the first reverse proxy will be terminated after a reattachment window, instruct, through the first reverse proxy, the database client to perform a session reattachment, receive, from the database client, a session reattachment request, including the reattachment token, for a second TCP network connection through a second reverse proxy, verify the reattachment token, and resume the database session with the database client, including the updated session state, for the second TCP network connection.

12. The system of claim 11, wherein the database server decides to perform a reattach after request based on a periodic check.

13. The system of claim 11, wherein the database server decides to perform a reattach during execution based on a periodic check.

14. The system of claim 11, wherein the first reverse proxy is terminated because of at least one of: (i) a cloud configuration change, (ii) service maintenance, and (iii) elasticity operations in a cloud edge layer.

15. The system of claim 11, wherein the second TCP network connection is established at least one of: (i) before the first TCP network connection is dropped, and (ii) after the first TCP network connection is dropped.

16. The system of claim 11, wherein the session reattachment is associated with a distributed protocol flow for a logical connection between an application with multiple physical connections to multiple database server nodes.

17. A computer-implemented method associated with a cloud computing database infrastructure, comprising:

establishing, by a computer processor of a database server, a database session with a database client, including a session state, for a first Transmission Control Protocol ("TCP") network connection through a first reverse proxy;

transmitting a reattachment token to the database client through the first reverse proxy;

receiving a database operation request from the database client through the first reverse proxy;

before or during execution of the database operation request, including any updates to the session state, receiving an indication from the cloud computing database infrastructure that the first reverse proxy will be terminated after a reattachment window;

instructing, through the first reverse proxy, the database client to perform a session reattachment;

receiving, from the database client, a session reattachment request, including the reattachment token, for a second TCP network connection through a second reverse proxy;

verifying the reattachment token; and resuming the database session with the database client, including the updated session state, for the second TCP network connection.

18. The computer-implemented method of claim 17, wherein the session state includes at least one of: (i) local temporary tables, (ii) open result cursors, (iii) currently executing queries, and (iv) transactions.

19. The computer-implemented method of claim 17, wherein the database server decides to perform a reattach based on a periodic check, and a reattach after request comprises an original request that has been completed and a full response is sent back to the database client before the database client starts the reattach.

20. The computer-implemented method of claim 17, wherein the database server decides to perform a reattach during execution based on a periodic check, and the reattach during execution comprises an original request that is still running when the database server instructs the database client to do the reattach during execution.

* * * * *